United States Patent
Wang et al.

(10) Patent No.: US 6,912,446 B2
(45) Date of Patent: Jun. 28, 2005

(54) SYSTEMS AND METHODS FOR AUTOMATED SENSING AND MACHINING FOR REPAIRING AIRFOILS OF BLADES

(75) Inventors: Weiping Wang, Palo Alto, CA (US); Martin Kin-Fei Lee, Niskayuna, NY (US); Bin Wei, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/278,492

(22) Filed: Oct. 23, 2002

(65) Prior Publication Data

US 2004/0083024 A1 Apr. 29, 2004

(51) Int. Cl.$^7$ ............................................ G06F 19/00
(52) U.S. Cl. ........................ 700/193; 700/98; 700/105; 700/118; 700/163; 29/889.1
(58) Field of Search ................... 700/195, 98, 105, 700/118, 161, 163; 702/155; 72/16.2; 29/889.1

(56) References Cited

U.S. PATENT DOCUMENTS

| | | | |
|---|---|---|---|
| 3,932,923 A | * 1/1976 | DiMatteo | .................. 700/161 |
| 4,951,217 A | 8/1990 | Clack et al. | |
| 5,055,752 A | * 10/1991 | Leistensnider | ............... 72/16.2 |
| 5,539,675 A | 7/1996 | Carroll Sr. et al. | |
| 5,552,992 A | 9/1996 | Hunter | |
| 6,238,187 B1 | 5/2001 | Dulaney et al. | |
| 6,326,585 B1 | * 12/2001 | Aleshin et al. | ......... 219/121.63 |
| 6,332,272 B1 | 12/2001 | Sinnott et al. | |
| 6,341,936 B1 | 1/2002 | Cowie et al. | |
| 6,453,211 B1 | * 9/2002 | Randolph et al. | ............ 700/195 |
| 6,568,077 B1 | * 5/2003 | Hellemann et al. | ......... 29/889.1 |

* cited by examiner

*Primary Examiner*—Albert W. Paladini
(74) *Attorney, Agent, or Firm*—Penny A. Clarke; Patrick K. Patnode

(57) ABSTRACT

A method for repairing an airfoil comprising creating a nominal numerically-controlled tool path based on a nominal shape of the airfoil, measuring the airfoil using a displacement sensor, capturing differences in the airfoil shape as compared to the nominal shape, creating a three-dimensional map by synchronizing x, y and z coordinates and readings from the sensor, modifying the tool path based on the three-dimensional map, and machining the airfoil. A system for measuring and machining an airfoil comprising a computer operable for data acquisition and numerically-controlled tool path generation, a numerically-controlled machine, a cutting tool holder comprising a plurality of cutting tools, and a displacement-sensing probe.

26 Claims, 4 Drawing Sheets

SYSTEMS AND METHODS FOR AUTOMATED SENSING AND MACHINING FOR REPAIRING AIRFOILS OF BLADES

BACKGROUND OF THE INVENTION

1. Field of the Invention

The present invention relates generally to the field of airfoil repair. More particularly, the present invention relates to systems and methods for measuring airfoil shape to be repaired, comparing the measured airfoil to a nominal shape, and generating a numerically-controlled (NC) tool path to blend a weld-repaired region smoothly with its adjacent surfaces.

2. Description of the Related Art

Airfoils of gas turbine engines are regularly exposed to harsh operating conditions, such as foreign object damage (FOD), high operating temperatures, vibrations and significant pressure fields, as part of normal operating conditions of the engine. For metallic airfoils disposed within an engine, the extreme thermal cycling of normal engine operation represents one of the more deleterious conditions that amplifies the already severe circumstances under which the airfoils must operate. Typically, these operating conditions act over time to deteriorate and weaken the airfoils, making them susceptible to the formation of damage areas such as cracks, pits and depressions. Airfoils must be periodically inspected, repaired and even replaced. If damage is not properly addressed and repaired correctly, the airfoils may become irreparably damaged as a result of the rapid propagation of existing damage. In addition, if not properly repaired, cracks and other structural weaknesses may lead to other engine component failure.

It is known that turbine blades may develop one or more cracks near the tip of a blade due to low cycle fatigue stresses imparted on the blade tip during the operation of the turbine. If a crack extends beyond a critical dimension, the turbine blade must be removed from service and/or repaired in order to prevent catastrophic failure of the blade and turbine. It can be appreciated that a crack may be repaired by removing the material adjacent to the crack to form a crack repair volume, and then filling the crack repair volume with weld metal. Welding allows the service life of the blade to be extended, saving the time and costs associated with replacing the part.

Various conventional methods for repairing airfoils involve the use of a coordinate measurement machine (CMM) or a specialized laser scanner to measure the blade. A CMM uses a mechanical probe that traverses a path covering the surface of the article to be measured. CMM machinery typically works with algorithms that recognize part features, such as edges, from user supplied nominal locations. A CMM process, however, is slow, interactive and operator intensive. Laser scanning is technique used to collect data points from the surface of a 3-dimensional article. The data points correspond to coordinate values over the surface of the scanned article, e.g. taken along the x, y, and z axes. A laser scan traverses a scan path over the surface of an article, and at selectable distances along the path point values may be taken. A laser scan generally results in the generation of a set of scan data in a digitized format. Laser scanning is limited by the great magnitude of data that must be processed relative to other measuring techniques. Another factor is the limited ability of laser scan software algorithms to recognize or differentiate surface transition features, such as corners, vertices, openings and boundaries.

Still another factor is the difficulty in correlating the scan path of the laser head to a desired tool path for a numerically-controlled (NC) machine tool. A correlation between the laser scan path and the NC tool cutting path may result in gouging of the article. These limitations become pronounced when laser scanning is used for capturing the geometry of complex parts such as a blade. An airfoil of a blade is typically a complex free-form shape and requires many measurements to accurately define its shape.

In addition, while these repair techniques have been developed to repair damage, these methods are not suitable for on-machine measurement because they demand additional set-ups. They also require reverse engineering software to reconstruct the blade geometry using mathematical models such as spline surfaces. Reconstructing the blade geometry using spline surfaces tends to create mathematical artifacts. These artifacts can introduce dimensional errors in the final numerically-controlled (NC) tool path that is generated from the spline surfaces.

It is costly to replace used turbine blades with brand new blades, since these precision parts are made of expensive, high-temperature materials requiring complicated processing and machining operations. A lower-cost alternative is to repair only the region of the blade that has worn out or been damaged. It is therefore imperative that repair strategies be developed to facilitate a renewal of the engine component that restores it to a physical condition resembling its original state. What are needed are integrated systems and methods that can measure and machine airfoil blades that are weld-repaired.

BRIEF SUMMARY OF THE INVENTION

The present invention provides systems and methods for measuring a blade shape to be repaired, comparing the measured blade to a nominal shape, and generating a numerically-controlled (NC) tool path to blend a weld-repaired region smoothly with its adjacent surfaces. The dimension of the blade may be measured using a mechanical contact probe such as a digital dial indicator or a linear variable differential transformer (LVDT). The probe may be mounted on a computer-controlled multi-axis machine that can move in the x, y and z directions as well as rotational degrees-of-freedom as needed to scan the shape of the blade. The digital output probe may also be connected to the computer. The computer may record the 3-dimnesional differences of the part shape with respect to its nominal shape. The differences may then be used to adaptively program the NC machining tool path.

The systems and methods of the present invention make airfoil repair simple and highly adaptive to blade geometry distortion. The invented integrated measuring and machine system uses a digital probe mounted on the machine tool to measure the difference between the measured blade and the nominal blade, rather than conventional systems that use coordinate measuring machines (CMM) and laser-scanning devices to reconstruct the blade shape. The measured difference is used to create a customized tool path for each blade that can deviate from its nominal.

In one embodiment, the present invention comprises a method for measuring and machining a blade having a weld-repaired region. The method comprises measuring the blade having the weld-repaired region with a displacement-sensing probe, comparing the measured blade to a nominal shape of the blade, recording three-dimensional differences of the blade having the weld-repaired region with respect to the nominal shape, and generating a numerically-controlled tool path to blend the weld-repaired region smoothly with its adjacent surfaces.

In another embodiment, the displacement-sensing probe may include a linear variable differential transformer (LVDT), a digital dial indicator, a laser distance sensor, and a laser triangulation sensor and may be mounted on a computer-controlled multi-axis machine operable for moving in x, y and z directions with other rotational degrees of freedom as needed to scan the shape of the blade having the weld-repaired region. The displacement-sensing probe readings may be recorded together with positions of axes of the computer-controlled multi-axis machine.

In a further embodiment, the present invention comprises a system for measuring and machining a blade having a weld-repaired region. The system comprises a displacement-sensing probe operable for measuring the dimensions of the blade, a computer-controlled multi-axis machine operable for moving the displacement-sensing probe in the x, y and Z directions as well as other rotational degrees of freedom to scan the shape of the blade, an adjustable platform operable for holding and positioning the blade, a tool holder comprising a plurality of cutting tools, and a computer in connection with and operable for controlling the displacement-sensing probe, the multi-axis machine, the adjustable platform and the tool holder, wherein the computer is further operable for recognizing a deviation of the blade geometry from a nominal shape and creating a numerically-controlled tool path customized for machining the blade.

In a still further embodiment, the present invention comprises a method for repairing an airfoil. The method comprises providing the airfoil on a measurement and machining system, creating a nominal numerically-controlled tool path based on a nominal shape of the airfoil and the airfoils position on the measuring and machining system, measuring the airfoil using a sensor, capturing differences in the airfoil shape as compared to the nominal shape, creating a three-dimensional map by synchronizing x, y and z coordinates and readings from the sensor, modifying the tool path based on the three-dimensional map, and machining the airfoil.

In a still further embodiment, the present invention comprises a system for measuring and machining an airfoil. The system comprises a computer operable for data acquisition and numerically-controlled tool path generation, a numerically-controlled machine, a cutting tool holder comprising a plurality of cutting tools, and a displacement-sensing probe.

BRIEF DESCRIPTION OF THE DRAWINGS

A variety of specific embodiments of this invention will now be illustrated with reference to the Figures. In these Figures, like elements have been given like numerals.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. The systems and methods described below apply to automated sensing and machining for repairing airfoil blades, however, in principle also apply to any automated sensing and machining systems and methods.

Figure 1:
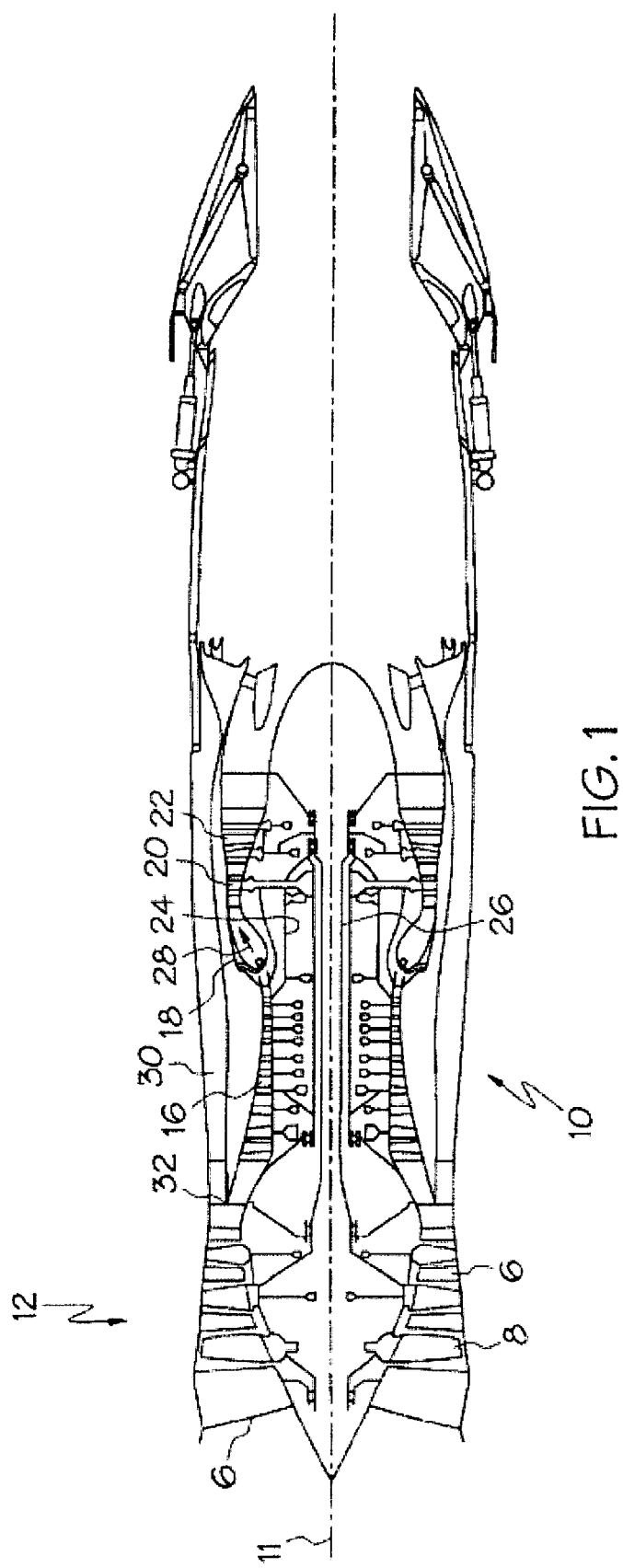
FIG. 1 is a cross-sectional illustrative view of an exemplary aircraft gas turbine engine having airfoils that are repaired using the automated sensing and machining techniques in accordance with an exemplary embodiment of the present invention.

Referring now to FIG. 1, one example of an aircraft turbofan gas turbine engine is illustrated. While this exemplary turbine engine is shown, it is to be understood that the present invention applies to the repair of airfoil blades associated with the engine of FIG. 1, as well as any other fan, compressor, turbine, integrated blade and rotor assembly, and impeller. The engine 10 comprises fan vanes 6 and fan blades 8. The gas turbine engine 10 is circumferentially disposed about an engine centerline 11 and has, in serial flow relationship, a fan section 12, a high-pressure compressor 16, a combustion section 18, a high-pressure turbine 20 and a low-pressure turbine 22. The combustion section 18, high-pressure turbine 20 and low-pressure turbine 22 are often referred to as the "hot" portion of the engine 10. A high-pressure rotor shaft 24 connects, in driving-relationship, the high-pressure turbine 20 to the high-pressure compressor 16, and a low-pressure rotor shaft 26 drivingly connects the low-pressure turbine 22 to the fan section 12. Fuel is burned in the combustion section 18 producing a very hot gas flow 28 that is directed through the high-pressure and low pressure turbines 20 and 22, respectively, to power the engine 10. A portion of the air passing through the fan section 12 is bypassed around the high-pressure compressor 16 and the "hot" section through a bypass duct 30 having an entrance or splitter 32 between the fan section 12 and the high-pressure compressor 16. Many engines have a low-pressure compressor (not shown) mounted on the low-pressure rotor shaft 26 between the splitter 32 and the high-pressure compressor 16. Blades and vanes having airfoils are used in the fan, compressor, and turbine sections of the engine and the present invention can potentially be applied to airfoils of all blades and vanes.

Figure 2:
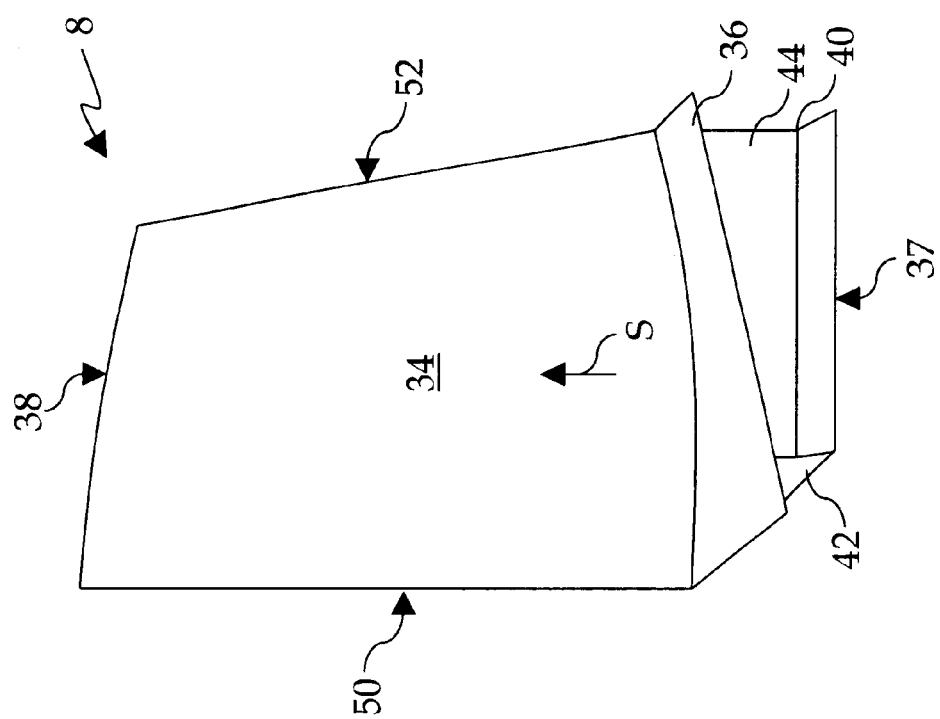
FIG. 2 is a perspective illustrative view of an exemplary aircraft gas turbine engine fan blade in FIG. 1 having an airfoil in accordance with an exemplary embodiment of the present invention.

Referring now to FIG. 2, the fan blade 8 comprises an airfoil 34 extending radially outward in a spanwise direction S from an airfoil base on a blade platform 36 to an airfoil or blade tip 38. The fan blade 8 includes a root section 40 extending radially inward from the platform 36 to a radially inward end 37 of the root section 40. At the radially inward end 37 of the root section 40 is a blade root 42 that is connected to the platform 36 by a blade shank 44. The airfoil 34 extends in the chordwise direction between a leading edge 50 and a trailing edge 52 of the airfoil 34.

Referring again to FIG. 2, fan blade 8 has a trailing edge section that extends along the trailing edge 52 of the airfoil 34 from the blade platform 36 to the blade tip 38. The trailing edge section comprises a predetermined width such that the trailing edge section encompasses nicks, cracks, depressions and tears that may occur along the airfoil 34. The nicks, cracks, depressions, and tears may be caused by foreign object damage (FOD), high operating temperatures, vibrations, and significant pressure fields. The airfoil 34 is subject to a significant tensile stress field due to centrifugal forces generated by the fan blade 8 rotating during engine operation. The airfoil 34 is also subject to vibrations and crack growth from FOD generated during engine operation.

The present invention provides systems and methods whereby repairs are made to any region of the blade that has worn-out or been damaged, such as the blade tip 38, leading edge 50, trailing edge 52, root section 40, etc. Damage to the airfoils occurs as time goes on, leading to period inspections. Inspections may reveal defects that lead to repair and replacement. Conventionally, to repair a worn blade, a new material is deposited and fused to the blade by methods such as welding, then, the weldment is precision machined to the final shape. As a blade has been subjected to field service, the blade's geometry can deviate significantly from its nominal shape. Thus, the NC part program used to produce the new blades cannot be applied, it must be customized based on the actual shape of each individual blade. This allows the service life of the blade or vane to be extended, saving time and costs associated with replacement.

The blade 8 represents a turbine blade manufactured or repaired in accordance with the present invention. A plate may be welded to the surface of the blade 8 in order to cover a damaged portion. The material of the plate may be chosen to facilitate the welding of the plate to the surface of the blade 8. Typically, the weld material and plate are selected to be the same material as that of the blade 8. Cracks may be repaired by filling a crack repair volume with a weld. Welding may include conventional and laser welding.

Figure 3:
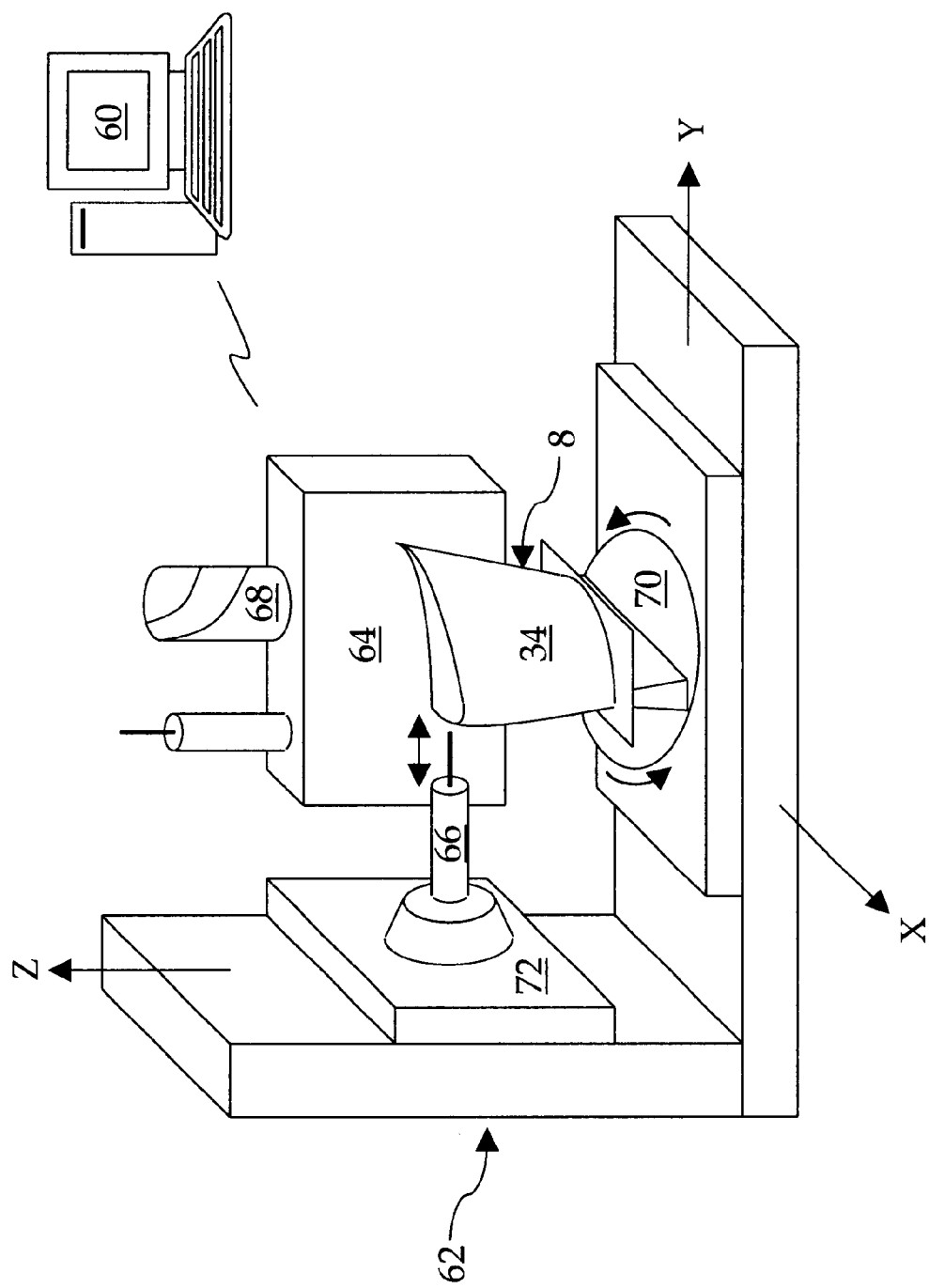
FIG. 3 is a perspective illustrative view of an automated sensing and machining system for repairing airfoil blades in accordance with an exemplary embodiment of the present invention.

Referring now to FIG. 3, a schematic view of the on-machine measurement and machining system for blade repair of the present invention is illustrated. The system comprises a PC-based computer 60 operable for data acquisition and numerically-controlled (NC) tool path generation, an NC machine 62 equipped with a tool holder 64, and a displacement-sensing probe 66. In one embodiment, the displacement-sensing probe 66 may be mounted on the tool holder 64. Depending on the configuration, the tool holder 64 may be a separate unit or the same one that also holds a cutting tool 68 during the subsequent machining operation. The blade 8, comprising the weld-repaired airfoil portion 34, is positioned on a computer-controlled rotatable platform 70 having rotational degrees-of-freedom as needed to scan the shape of the blade 8. The displacement-sensing probe 66 may be mounted on a computer-controlled multi-axis machine 72, which may move in the x, y, and z directions with rotational degrees-of-freedom as needed to scan the shape of the blade 8. The digital output of the displacement-sensing probe 66 may also be connected to the computer 60.

In one embodiment, the displacement-sensing probe 66 comprises a mechanical contact probe such as a linear variable differential transformer (LVDT). The LVDT provides accurate position indication. The LVDT is a linear displacement transducer that works on a principle of mutual inductance producing an electrical signal that is proportional to a separate moving core or armature. LVDT devices allow a very flexible design and may be built with ranges as low as about 0.00002 mm to about 800 mm. A typical LVDT device consists of a hollow metallic cylinder in which a core moves freely back and forth along the cylinder's long axis. Differences in surface height of the blade 8 move the core within the hollow cylinder. This motion is then measured electronically.

The LVDT comprises a primary coil, two secondary coils and the separate moveable core. When an AC excitation signal is applied to the primary coil of the LVDT, voltages are induced in the two secondary coils. The moving magnetic core inside the coil winding assembly provides the magnetic flux path linking the primary and secondary coils. Since the two voltages are of opposite polarity, the secondary coils are connected series opposing in the null position, or center. The output voltages are equal and opposite in polarity and, therefore, the output voltage is zero. The null position of an LVDT is extremely stable and repeatable. When the magnetic core is displaced from the null position, an electromagnetic imbalance occurs. This imbalance generates a differential AC output voltage across the secondary coils that is linearly proportional to the direction and magnitude of the displacement. Therefore, when the magnetic core is moved from the null position as it comes into contact with regions of the blade 8, the induced voltage in the secondary coil, toward which the core is moved, increases while the induced voltage in the opposite secondary coil decreases.

The fundamental advantages of LVDT transducers over other types of displacement transducers are their high degree low friction infinite resolution, their ability to operate at high temperatures and their reliability. In an LVDT, any movement of the core causes a proportional change in output. Failures are limited to rare electrical faults that may cause erratic or erroneous indications.

Alternative mechanical contact sensors may include a digital dial indicator, laser distance sensor, laser triangulation sensor (non-contact sensor) or other types of displacement sensors. A digital dial indicator may be used to measure changes in height on the surface of the blade 8. As with the LVDT, the digital dial indicator is mounted on the computer-controlled multi-axis machine 72 to provide moveable positions. In a typical digital dial indicator, changes in distance are recognized and sent to the computer 60, which in turn translates deviations into a tool path. A digital dial indicator suitable for use with the present invention should provide more than enough travel for the overall movement to be measured, and should be sensitive enough for its purpose. The digital dial indicator may also be used in adjusting the placement of a blade 8 on the rotatable platform 70.

The probe 66 readings are recorded together with the positions of the axes of the computer-controlled multi-axis machine 72. The positions of the motion axes may either be read from the axes position registers of the numerically-controlled motion controller if the controller allows, or directly from the axes encoders. The acquired data is used to capture the deviation of the blade geometry from its nominal and the deviation is then used to create an NC tool path customized for machining the blade.

The on-machine computer-controlled rotatable platform 70 operable for holding the blade 8 may include a circular housing comprising a mechanism for adjustably securing the blade 8, such as a clamping fixture. In one embodiment, the blade root 42 is clamped to an upper surface of the platform 70 in a vertical position for measurement, i.e. the axis of the blade 8 is vertical with the displacement-sensing probe 66 being perpendicular to the surface of the blade 8. In alternative embodiments, the blade 8 may be clamped in any position relative to the surface of the rotatable platform 70 and displacement-sensing probe 66. For positioning and holding the blade 8, any known securing means may be employed that do not interfere with the operation of the measurement and machining system.

The rotatable platform may further include a rotary slide assembly, a bearing assembly, a drive assembly, a drive motor, a driven shaft, and a drive pulley. As stated above, the rotatable platform 70 provides rotational degrees-of-freedom as needed to scan the shape of the blade 8. A used blade 8, which is geometrically similar in shape to its nominal blade, should be positioned in approximately the same location and orientation on the platform 70 as the nominal blade is assumed to be, allowing a certain amount of positional deviation (about 0.25 inches). The computer 60 is operable for recognizing both blade deformation and blade misplacement.

In one embodiment, the numerically-controlled machine 62 is operable for machining, grinding and shaping the blade 8. During blade 8 machining, tool wear may occur. For example, a new cutting tool 68 selected at the beginning of the machining process may, during the machining operation, undergo wear. The computer 60 may recognize tool wear by noting a deviation of the actual machined part from the tool path stored in the computer 60. From this information, the computer 60 may then calculate a new tool path that corrects for tool wear.

Figure 4:
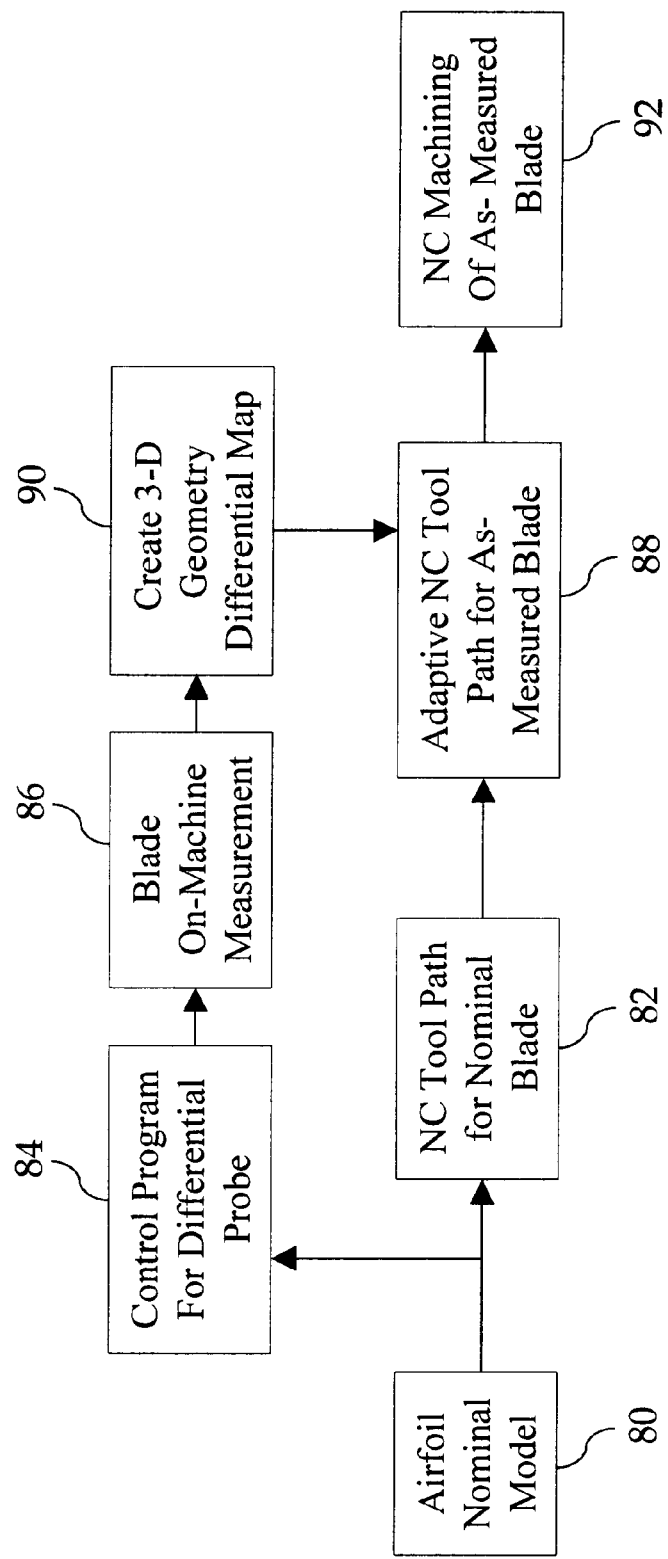
FIG. 4 is a flow chart illustrating a process for measuring and machining a weld-repaired blade in accordance with an exemplary embodiment of the present invention.

Referring now to FIG. 4, the procedures for machining a weld-repaired blade 8 using the measurement and machining system are shown. Initially, a nominal NC tool path is created (Block 82) based on the nominal shape of the blade (Block 80) from the manufacturer and the blades position/orientation on the NC machine 62. The nominal shape is also used to create an NC program (Block 84) that, later, will move the probe tip on the blade to be repaired. The used blade is mounted onto a clamping fixture on the NC machine 62. The used blade 8, which is geometrically similar to its nominal blade, should be positioned in approximately the same location and orientation on the machine as the nominal blade is assumed to be, allowing a certain amount of positional deviation. The blade is then moved by the nominal NC tool path in front of the displacement-sensing probe 66 (Block 86). If the shape, orientation and location of the blade 8 are perfectly the same as those of the nominal blade, the sensor will register no deviation, and no machining will be performed. However, if deviations do occur, as is typically the case with weld-repaired blades 8, such deviations as well as the positions of the computer-controlled multi-axis machine 72, are captured with the computer 60 (Block 88). By synchronizing the x, y, z coordinates and the readings from the displacement-sensing probe 66, a 3-dimensional map is created for the difference between the as-measured blade and the nominal shape (Block 90). Based on the 3-dimensional map, the nominal tool path is then modified according to the collected data by the computer 60 and sent back to the NC machine 62 to mill the blade accordingly (Block 92).

One or more parameters of the blade 8 may be sensed while relative motion is caused between the displacement-sensing probe 66 and the blade 8 by means of both the platform 70 and the computer-controlled multi-axis machine 72. The displacement-sensing probe 66 may be operated at a sensing rate that is independent of the speed of relative motion between the platform 70 and the multi-axis machine 72. In one operational mode, both the platform 70 and the multi-axis machine 72 may be used to cause motion between the probe 66 and the blade 8 until the probe 66 is in a predetermined position relative to a surface of the blade 8, such as the trailing edge. Then, relative motion between the probe 66 and the blade 8 is caused so that the probe 66 in an initial direction to the surface of the blade 8 to scan the surface. In a contact mode, such as when sensing height variations between a welded region and an un-welded region of the surface of the blade 8, the predetermined position of the sensor assembly relative to the blade 8 is such that the tip of the probe 66 is in contact with the surface of the blade 8 region to be measured. In a non-contact mode, such as when the blade 8 is being machined, the predetermined position of the sensor is such that the probe tip is not in contact with the surface of the blade 8. The computer 60 may be programmed for locating and measuring a feature of interest of a surface of the blade 8, such as a welded region, or programmed to measure the surface of the blade 8 in its entirety for multiple regions.

In a further embodiment of the present invention, the nominal shape of a blade 8 may be defined as the already distorted shape of the blade, minus the weld-repaired region. As a blade has been subjected to field service, the blades geometry may deviate significantly from its nominal shape. Thus, the tool path may be customized based on the actual shape of each individual blade. For example, if the tip portion 38 of a blade 8 is missing due to damage, as is sometimes the case with solid compressor blades, the blade tip 38 shape may be extrapolated based on a blend of the nominal geometry.

Once a used blade 8 has been measured using the LVDT or other sensor 66, the x, y, z coordinates translated into the numerically-controlled tool path and the blade 8 machined, the sensor 66 may be instructed by the computer 66 to take another reading of the shape of the blade 8 for validation purposes. If deviations from the nominal shape are still detected by the computer 60, the computer 60 may instruct the NC machine 62 to repeat the measurement and machining process.

One advantage provided by the systems and methods of the present invention is the elimination of the need for using additional measuring equipment, such as coordinated measurement machines and laser-scanners, thereby minimizing the costs of capital equipment. Another advantage of the present invention is that off-line set-up time and off-line measurement time are eliminated, thus reducing accumulated error due to multiple set-ups, the overall cycle time and floor space. A further advantage is the elimination of the need to reconstruct an airfoil surface from the measured data, which tends to introduce surface artifacts due to underlying mathematical splines. A still further advantage is that when transitioned to repair shops, the systems and methods of the present invention provide a repairer an improved method for turbine overhauling. A still further advantage is that because the measuring and machining methods are capable of inspecting and milling the entire surface area of a blade 8, the repair methods of the present invention are well suited for handling large-area repair regions and multiple neighboring repair regions.

It is apparent that there have been provided, in accordance with the systems and methods of the present invention, automated sensing and machining systems and methods for repairing airfoil blades. Although the systems and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A method for measuring and machining a blade having a weld-repaired region, the weld-repaired region being selected from the group consisting of a plate welded to a surface of the blade, a weld-filled crack repair volume, and combinations thereof, the method comprising:

measuring the blade having the weld-repaired region with a displacement-sensing probe to acquire a plurality of data corresponding to the actual shape of the blade having the weld-repaired region;

comparing the data to a nominal shape of the blade to determine a plurality of three-dimensional differences of the blade having the weld-repaired region with respect to the nominal shape;

generating a numerically-controlled tool path using the three dimensional differences, the numerically controlled tool path being customized to blend the weld-repaired region smoothly with its adjacent surfaces; and blending the weld-repaired region using the numerically controlled tool path.

2. The method of claim 1, wherein the displacement-sensing probe is selected from the group consisting of: a linear variable differential transformer (LVDT), a digital dial indicator, a laser distance sensor, and a laser triangulation sensor.

3. The method of claim 2, wherein the displacement-sensing probe is mounted on a computer-controlled multi-axis machine operable for moving in x, y and z directions with other rotational degrees of freedom as needed to scan the shape of the blade having the weld-repaired region.

4. The method of claim 3, wherein the data comprise displacement-sensing probe readings, which are recorded together with positions of axes of the computer-controlled multi-axis machine.

5. The method of claim 1, wherein a nominal numerically-controlled tool path is created based on the nominal shape of the blade and the blade's position on a numerically-controlled machine.

6. The method of claim 1, wherein the measuring recognizes both blade deformation and blade misplacement on a numerically-controlled machine.

7. The method of claim 1, wherein the blending of the weld-repaired region is performed using a cutting tool of a numerically-controlled machine.

8. A system for measuring and machining a blade having a weld-repaired region, the weld-repaired region being selected from the group consisting of a plate welded to a surface of the blade, a weld-filled crack repair volume, and combinations thereof, the system comprising:

a displacement-sensing probe operable for measuring a plurality of dimensions of the blade in the weld-repaired region;

a computer-controlled multi-axis machine operable for moving the displacement-sensing probe in the x, y and Z directions as well as other rotational degrees of freedom to scan the shape of the blade in the weld-repaired region;

an adjustable platform operable for holding and positioning the blade having the weld-repaired region;

a tool holder comprising a plurality of cutting tools; and a computer in connection with and operable for controlling the displacement-sensing probe, the multi-axis machine, the adjustable platform and the tool holder, wherein the computer is further operable for recognizing a deviation of the blade geometry from a nominal shape and creating a numerically-controlled tool path customized for machining the blade having the weld-repaired region, and wherein the computer is programmed to locate the weld-repair region on the blade for measuring the weld-repair region.

9. The system of claim 8, wherein the displacement-sensing probe is selected from the group consisting of: a linear variable differential transformer (LVDT), a digital dial indicator, a laser distance sensor, and a laser triangulation sensor.

10. The system of claim 8, wherein the plurality of cutting tools are operable for blending the weld-repaired region.

11. The system of claim 8, wherein a plurality of displacement-sensing probe readings are recorded together with a plurality of positions of axes of the computer-controlled multi-axis machine.

12. The system of claim 8, wherein a nominal numerically-controlled tool path is created based on the nominal shape of the blade and the blade's position on the adjustable platform.

13. The system of claim 8, wherein the nominal shape comprises the shape of the blade provided by a manufacturer before the blade is put into service.

14. The system of claim 8, wherein the nominal shape comprises an already distorted shape of the blade minus the weld-repaired region.

15. A method for repairing an airfoil having a weld-repaired region, the weld-repaired region being selected from the group consisting of a plate welded to a surface of the airfoil, a weld-filled crack repair volume, and combinations thereof, comprising:

providing the airfoil on a measurement and machining system;

creating a nominal numerically-controlled tool path based on a nominal shape of the airfoil and the airfoil's position on the measuring and machining system;

measuring the airfoil in the weld-repair region using a sensor to acquire a plurality of readings from the sensor corresponding to the actual shape of the airfoil;

creating a three-dimensional map by synchronizing a plurality of x, y and z coordinates for the measurement and machining system and the readings from the sensor;

modifying the nominal numerically controlled (NC) tool path based on the three-dimensional map to generate a customized NC tool path; and blending the weld-repair region on the airfoil using the customized NC tool path.

16. The method of claim 15, wherein the nominal shape comprises the shape of the airfoil provided by a manufacturer before the airfoil is put into service.

17. The method of claim 15, wherein the nominal shape comprises an already distorted shape of the airfoil minus the weld-repaired region.

18. The method of claim 17, wherein the sensor is mounted on a computer-controlled multi-axis machine operable for moving in x, y and z directions with other rotational degrees of freedom as needed to scan the shape of the airfoil having the weld-repaired region.

19. The method of claim 18, wherein the sensor readings are recorded together with a plurality of positions of axes of the computer-controlled multi-axis machine.

20. The method of claim 15, wherein the sensor is selected from the group consisting of: a displacement-sensing probe, a linear variable differential transformer (LVDT), a digital dial indicator, a laser distance sensor, and a laser triangulation sensor.

21. A system for measuring and machining an airfoil having a weld-repaired region, the weld-repaired region being selected from the group consisting of a plate welded to a surface of the airfoil, a weld-filled crack repair volume, and combinations thereof, comprising:

a numerically-controlled machine;

a displacement-sensing probe mounted on the numerically-controlled machine and operable for acquiring a plurality of displacement-sensing probe readings corresponding to the actual shape of the airfoil in the weld-repair region;

a computer operable for acquiring the displacement-sensing probe readings from the displacement-sensing probe and for generating a numerically-controlled tool path for the numerically-controlled machine using the displacement-sensing probe readings, wherein the computer is programmed to locate the weld-repair region on the airfoil for measuring the weld-repair region; and a cutting tool holder mounted on the numerically controlled machine and being equipped with a plurality of cutting tools, the cutting tools being adapted to blend the weld-repair region on the airfoil.

22. The system of claim 21, wherein the displacement-sensing probe is selected from the group consisting of: a linear variable differential transformer (LVDT), a digital dial indicator, a laser distance sensor, and a laser triangulation sensor.

23. The system of claim 21, wherein the numerically-controlled machine is operable for moving in x, y and z directions with other rotational degrees of freedom as needed to scan the shape of the airfoil.

24. The system of claim 21, wherein the displacement-sensing probe readings are recorded together with a plurality of positions of axes of the numerically-controlled machine.

25. The system of claim 21, wherein a nominal numerically-controlled tool path is created based on a nominal shape of the airfoil and the airfoil's position on the numerically-controlled machine.

26. The system of claim 21, wherein the computer is operable for recognizing both airfoil deformation and airfoil misplacement on the numerically-controlled machine.

* * * * *